(12) United States Patent
Li et al.

(10) Patent No.: US 12,513,145 B1
(45) Date of Patent: Dec. 30, 2025

(54) APPARATUS AND METHOD FOR USING A DECENTRALIZED IDENTITY VERIFIABLE CREDENTIAL TO AUTHENTICATE A USER IN THE OPEN AUTHORIZATION FRAMEWORK

(71) Applicant: Anonyome Labs, Inc., Salt Lake City, UT (US)

(72) Inventors: Qing Li, Cupertino, CA (US); Wenjing Wang, Santa Clara, CA (US); Paul Ashley, Toowong (AU)

(73) Assignee: Anonyome Labs, Inc., Salt Lake City, UT (US)

( * ) Notice: Subject to any disclaimer, the term of this patent is extended or adjusted under 35 U.S.C. 154(b) by 30 days.

(21) Appl. No.: 18/757,161

(22) Filed: Jun. 27, 2024

Related U.S. Application Data

(60) Provisional application No. 63/514,766, filed on Jul. 20, 2023.

(51) Int. Cl.
*H04L 9/40* (2022.01)

(52) U.S. Cl.
CPC ........ *H04L 63/0884* (2013.01); *H04L 63/083* (2013.01)

(58) Field of Classification Search
CPC .......................... H04L 63/0884; H04L 63/083
See application file for complete search history.

(56) References Cited

U.S. PATENT DOCUMENTS

2020/0264860 A1\* 8/2020 Srinivasan ................ G06F 8/65

\* cited by examiner

*Primary Examiner* — Huan V Doan
(74) *Attorney, Agent, or Firm* — Cooley LLP

(57) ABSTRACT

A method includes establishing a network connection between a proxy machine and a decentralized identity agent machine. The proxy machine and the decentralized identity agent machine are used to broker communications with a decentralized identity wallet machine and an authentication machine such that the decentralized identity wallet machine establishes an authenticated session at the authentication machine using a decentralized identity verifiable credential and without providing a username or password to the authentication machine.

7 Claims, 2 Drawing Sheets

APPARATUS AND METHOD FOR USING A DECENTRALIZED IDENTITY VERIFIABLE CREDENTIAL TO AUTHENTICATE A USER IN THE OPEN AUTHORIZATION FRAMEWORK

CROSS-REFERENCE TO RELATED APPLICATION

This application claims priority to U.S. Ser. No. 63/514,766, filed Jul. 20, 2023, the contents of which are incorporated herein by reference.

FIELD OF THE INVENTION

This invention relates generally to computer network communications. More particularly, this invention is directed to using a decentralized identity verifiable credential to authenticate a user in the open authorization framework.

BACKGROUND OF THE INVENTION

The Open Authorization (OAuth 2.0) framework is a standard that enables an application to access protected resources on a user's behalf or on its own behalf. For example, a user has an account with a cloud-based photo printing service. The user stores his photos in his Google® cloud account. The photo printing service is outside of the control of Google®. In this example, the photo printing service is the application, and the user's photos that are stored in the Google® cloud account are the protected resources. For the photo printing service to print those photos, the user must authorize the photo printing service read access to his photos. In essence the user delegates the "read photo" access right to the photo printing service. The user logins to the Google® cloud OAuth server to identify himself. He then assigns the "read photo" access right to the photo printing application. The Google® cloud OAuth server then translates this delegated access right into an authorization token and sends the authorization token to the photo printing application. The photo printing application then sends the authorization token together with its credential to the Google® Cloud OAuth server to obtain an access token. Then the photo printing service can access the photos in the Google® cloud by calling the associated Google® APIs. Each API call requires the access token.

In summary, the user authenticates with the OAuth server. After successful authentication, the user authorizes the application with certain access rights to the protected resources. This rights delegation results in an authorization token being issued to the application. The application then submits the authorization token to the OAuth server to obtain an access token to access the protected resources through Web-based APIs.

The user typically uses a username and password to authenticate with the OAuth server. Managing username and password requires diligence on the user's part to reduce potential theft or cyberattacks, especially when the user has many different usernames and passwords for different accounts. In the cloud-based photo printing service example, the user must maintain two different username and password sets for Google® cloud and the photo service account.

Verifiable credential (VC) is a digital credential that is tamper-evident and is verified cryptographically. A VC is machine verifiable. Each VC contains claims about the VC holder, such as name, sex, age, birthdate, passport number. VC is part of the decentralized identity (DI) ecosystem. In the DI ecosystem there are three main entities: the issuer, the holder, and the verifier. The issuer is an authority that issues a VC with the associated claims to a holder. The issued VC applies to a specific context or use case. For example, a university can issue a VC that contains claims about a person's achieved degree, such as major, GPA and graduation year. The person who receives this diploma VC is the holder. A potential employer that may offer the holder a job must request the holder to present this diploma VC to confirm his qualification. This potential employer is the verifier because the employer must verify the validity of the diploma VC, and then examines the claims within the VC against a job description.

An enterprise decentralized identity wallet is comprised of all three roles: the issuer, the holder, and the verifier. For example, the enterprise DI wallet can issue credentials to its employees for faster onboarding process. It can also issue credentials to its suppliers for business-to-business transactions. In this case the enterprise DI wallet is also a verifier. Additionally, an enterprise can be issued VCs from its business partners. In this case it is a holder.

An enterprise DI wallet is managed by multiple entities. These entities can be authorized employees, administrators, and delegated third party staff. We use the term administrator to reference all possible entities. The enterprise DI wallet administrators can perform various actions inside the wallet: issue credentials, verify credentials, send credential proofs, and accept credentials.

In view of the growing use of the Open Authorization framework and decentralized identities, it is desirable to establish more efficient and secure utilization of these resources.

SUMMARY OF THE INVENTION

A method includes establishing a network connection between a proxy machine and a decentralized identity agent machine. The proxy machine and the decentralized identity agent machine are used to broker communications with a decentralized identity wallet machine and an authentication machine such that the decentralized identity wallet machine establishes an authenticated session at the authentication machine using a decentralized identity verifiable credential and without providing a username or password to the authentication machine.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
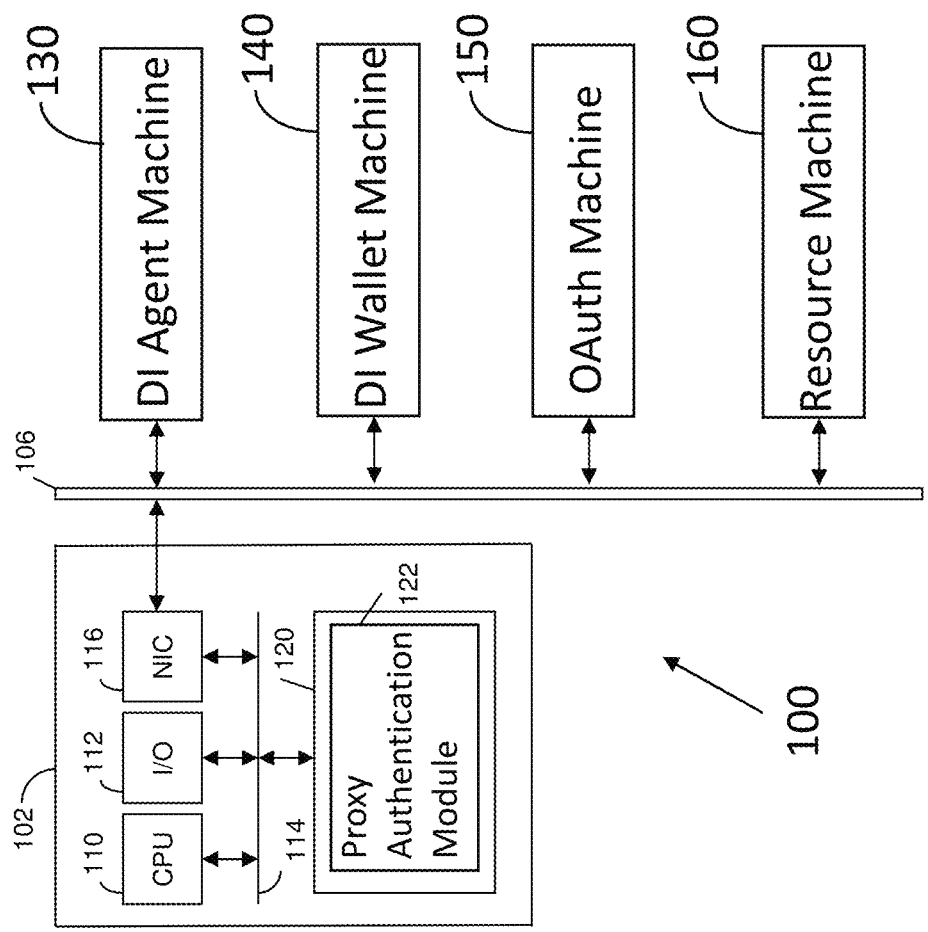
FIG. 1 illustrates a system configured in accordance with an embodiment of the invention.

FIG. 1 illustrates a system 100 configured in accordance with an embodiment of the invention. The system 100 includes a proxy authentication machine 102 in communication with a network 106, which may be any combination of wired and wireless networks. Also connected to the network 106 is a decentralized identity (DI) agent machine 130, a DI wallet machine 140, an Open Authorization (OAuth) machine 150 and a resource machine 160.

As used herein, a proxy authentication machine 102 is a new type of machine that brokers the communication between the decentralized identity agent machine 130 (also referred to as a decentralized identity verifiable credential agent machine) and the Open Authorization machine 150, helping to translate from one technology domain another. A decentralized identity agent machine 130 is a machine that implements credential formats and credential exchange protocols to issue decentralized identity verifiable credentials and to verify decentralized identity verifiable credential presentation proofs. A DI Wallet Machine 140 is a machine that accepts and stores decentralized identity verifiable credentials and creates presentation proofs from a decentralized identity verifiable credential. An Open Authorization (OAuth) Machine 150 is a machine that implements the OAuth protocols to provide access tokens to DI Wallet Machine 140 to allow access by an authenticated user. A decentralized identity verifiable credential is a tamper evident digital document that is verified cryptographically and is used to carry claims (such as authorization privileges) related to an individual. The Resource Machine 160 provides a set of APIs to be accessed by a network user.

As shown in connection with proxy authentication machine 102, each machine in system 100 includes a processor 110 and input/output devices 112 connected via a bus 114. The input/output devices 112 may include a keyboard, mouse, touch display and the like. A network interface circuit 116 is also connected to bus 114 to provide connectivity to network 106. A memory 120 is also connected to the bus. The memory 120 stores instructions executed by processor 110 to implement functions performed by each machine. In the case of the proxy authentication machine 102, the memory 120 stores a proxy authentication module 122 to implement operations disclosed herein.

The invention addresses the problem that a person can use the same username and password in different accounts. In such cases, when one account is compromised the chance of compromising other accounts for the same user by a nefarious actor is high.

Compromising a VC is much more difficult than compromising a username and its password. A VC is stored in a secure enclave along with the VC's secret keys and other meta data. The physical device has a security protection of its own. Account authentication and authorization with a VC is easier to manage and eliminates the need for a username and password.

This invention replaces the traditional OAuth server's authentication server with two new cooperating entities: the proxy machine 102 (also referred to as VC-to-OAuth or VC2OAuth server) and DI agent machine 130.

In the context of this patent application, the enterprise DI wallet 140 is a protected resource, as is the resource machine 160. The enterprise entity who owns and controls the enterprise DI wallet issues a unique VC to each administrator. The VC encodes a unique authorization token and specific access control rights for each administrator. The administrator accepts this issued credential and stores this VC in his administrator DI wallet of the DI wallet machine 140. That is, the DI wallet machine 140 has a DI wallet module stored in memory. The DI wallet module has instructions executed by a processor to perform these operations.

The administrator uses this stored VC each time the administrator needs to perform an operation within the enterprise DI wallet. Each operation is accomplished by calling a set of web-based APIs. Each API call requires the access token.

In one embodiment, the DI agent machine 130 communicates with the administrator DI wallet machine 140 using standard decentralized identifier communication (DIDComm) protocols. The proxy machine 102 understands and can communicate using the DIDComm protocols.

Figure 2:
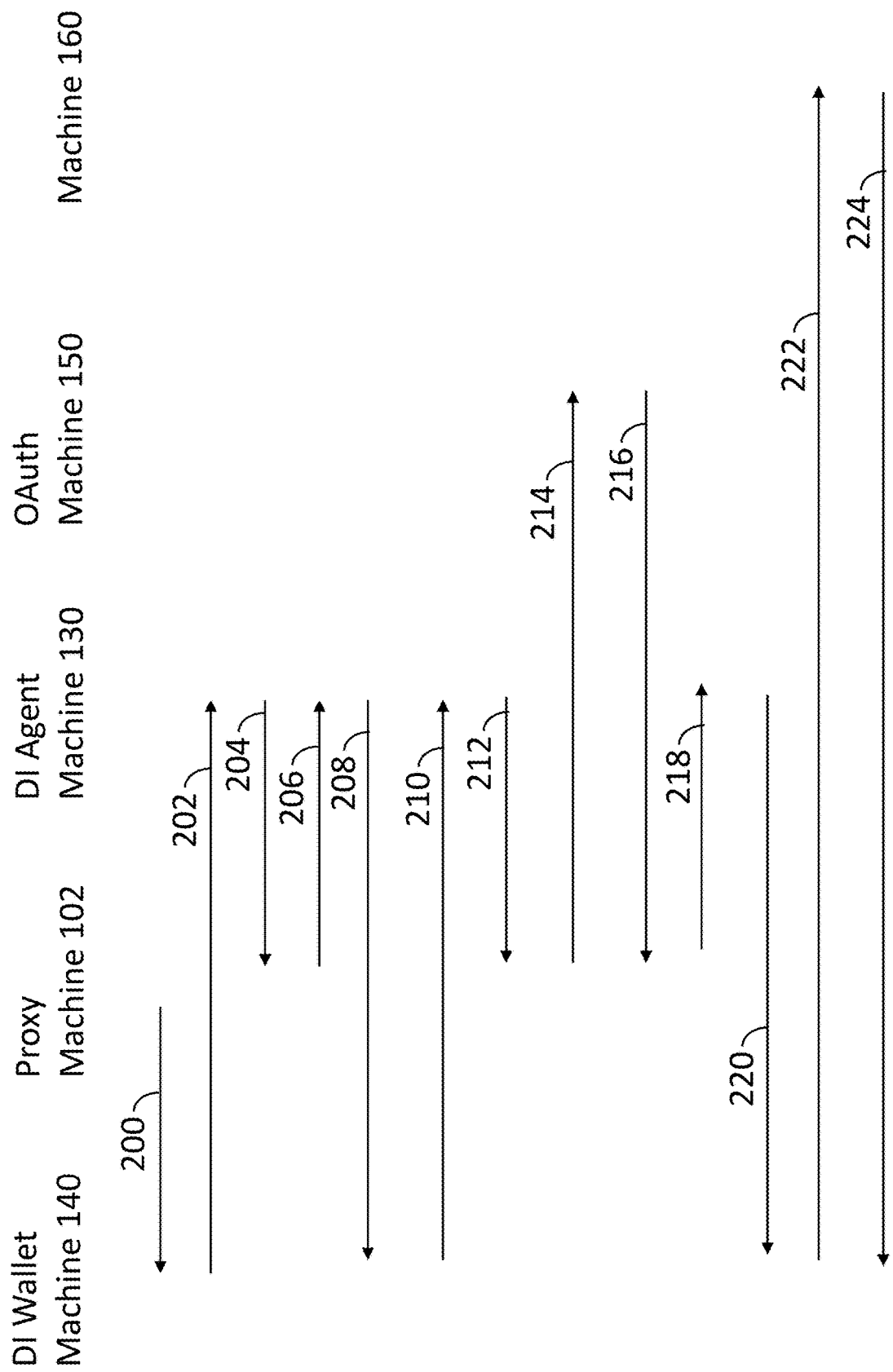
FIG. 2 illustrates signal exchanges within the disclosed system.

As shown in FIG. 2, the administrator first authenticates with the proxy machine 102. In one embodiment, the proxy machine 102 provides the administrator DI wallet machine 140 a QR code, as represented by signal 200 in FIG. 2. Signal 200 is a signal on network 106 generated by proxy machine 102 for delivery to DI wallet machine 140.

After scanning the QR code, the DI wallet machine 140 makes a DIDComm connection with the DI agent machine 130, as shown with signal 202. The DI agent machine 130 notifies the proxy machine 102 about the connection, as shown with signal 204. The proxy machine 102 checks its configured policies, and if permissible, requests the DI agent machine 130 to demand a VC proof from the DI wallet machine 140, as shown with signal 206. The DI agent machine 130 then requests the VC proof from the DI wallet machine 140, as shown with signal 208 and the DI wallet machine 140 presents the necessary proof according to its issued access VC, as shown with signal 210. The DI agent machine 130 informs the proxy machine 102 of a successful proof validation, as shown with signal 212. The proxy machine 102 then sends an access token request to the OAuth machine 150, as shown with arrow 214. The OAuth machine 150 generates the access token and transmits it to the proxy machine 102, as shown with signal 216.

The proxy machine 102 then gives this new access token to the DI agent machine 130, as shown with signal 218. The DI agent machine 130 then sends the access token over the existing DIDComm connection to the DI wallet machine 140, as shown with arrow 220. Now the DI wallet machine 140 can begin executing its administrative operations through the protected APIs. For example, the DI wallet machine 140 can send a request with access token to a protected resource, as shown with signal 222. The resource machine 160 then returns protected content, as shown with signal 224.

The access token specifies the rights an administrator has been delegated with. In the original OAuth2 context a set of rights is represented by an OAuth scope. The OAuth scope is a string in the OAuth protocol. OAuth scopes can be combined into a list representing a combination of rights. Since the OAuth scopes are defined as part of the OAuth server and are interpreted by the OAuth token endpoint, enforced by the APIs to the protected resources, this invention encodes the OAuth scopes into the attributes of the authentication VC that is issued to each administrator. One example encoding as a VC attribute may be:

Attribute name: OAuth_Scopes

Attribute value: "OAuth scopes in string representation"

When the administrator is asked to present the VC proof for authentication, the DI agent machine 130 requests the VC proof to include the "OAuth_Scopes" attribute. The associated scope attribute value is extracted from the VC proof and is sent to the OAuth machine 150 to obtain the access token. By encoding the OAuth scopes into one or more VC attributes, the access rights can be modified by issuing new credentials to the administrator to update the DI wallet.

According to the original OAuth specification, the OAuth system architecture allows for the separation of the authorization phase from the rest of the OAuth processes. As FIG. 2 shows, the introduction of the proxy machine 102 and the DI agent machine 130, and the exchange flow between these two entities, enables the seamless integration of VC and DI into the OAuth ecosystem, without changing any OAuth based operation beyond the authorization step.

In this invention, the proxy machine 102, the DI agent machine 130 and the DI wallet machine 140 are all under the same administrative domain. Therefore, the proxy machine 120 can have an established secure connection to the OAuth machine 150. Each credential identifies a unique DI wallet. Therefore, the proxy machine 102 leverages the credential ID to request unique access tokens. The proxy machine 102 submits the credential ID in the OAuth token request as an opaque block of binary data. The proxy machine 102 maintains the mapping between the credential ID and the obtained access token. This way the identity management function is isolated within the proxy machine 102, which can preserve and enhance privacy. The mapping between the credential ID and the access token allows proper audit trails for the API calls.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
    establishing a network connection between a proxy machine and a decentralized identity agent machine; and
    using the proxy machine and the decentralized identity agent machine to broker communications with a decentralized identity wallet machine and an authentication machine such that the decentralized identity wallet machine establishes an authenticated session at the authentication machine using a decentralized identity verifiable credential and without providing a username or password to the authentication machine, wherein using the proxy machine includes the proxy machine;
        receiving from the decentralized identity agent machine a notification signal about a connection with the decentralized identity wallet machine,
        sending to the decentralized identity agent machine a verifiable credential proof demand signal,
        receiving from the decentralized identity agent machine a successful proof validation signal,
        sending to the authentication machine an access token request,
        receiving from the authentication machine an access token signal, and
        sending to the decentralized identity agent machine the access token signal.

2. The method of claim 1 further comprising utilizing decentralized identifier communication (DIDComm) protocols between the decentralized identity wallet machine and the decentralized identity agent machine.

3. The method of claim 1 further comprising maintaining at the proxy machine privacy preserving mappings between verifiable credentials and access tokens.

4. The method of claim 1 further comprising encoding administrator access rights in a verifiable credential.

5. The method of claim 1 further comprising mapping Open Authorization scopes into verifiable credential attributes and retrieving the Open Authorization scopes during a verifiable credential proof process.

6. The method of claim 1 further comprising issuing a new verifiable credential without updating an associated application.

7. The method of claim 1 wherein the authentication machine is an Open Authorization framework based authentication machine.

* * * * *